(12) United States Patent
Ha et al.

(10) Patent No.: US 11,675,561 B2
(45) Date of Patent: Jun. 13, 2023

(54) DISPLAY APPARATUS

(71) Applicant: LG Display Co., Ltd., Seoul (KR)

(72) Inventors: GyungBo Ha, Paju-si (KR); Taehyung Kim, Paju-si (KR); Seeun Kim, Paju-si (KR); HakMo Hwang, Paju-si (KR); Seung Jun Koo, Paju-si (KR)

(73) Assignee: LG Display Co., Ltd., Seoul (KR)

(*) Notice: Subject to any disclaimer, the term of this patent is extended or adjusted under 35 U.S.C. 154(b) by 294 days.

(21) Appl. No.: 16/918,370

(22) Filed: Jul. 1, 2020

(65) Prior Publication Data

US 2021/0004198 A1    Jan. 7, 2021

(30) Foreign Application Priority Data

Jul. 4, 2019   (KR) .................. 10-2019-0080584

(51) Int. Cl.
*G06F 1/16*        (2006.01)
*G06F 3/16*        (2006.01)
(Continued)

(52) U.S. Cl.
CPC .............. *G06F 3/16* (2013.01); *G06F 1/1605* (2013.01); *G06F 1/203* (2013.01); *G10K 9/122* (2013.01)

(58) Field of Classification Search
CPC ... H04R 1/02; H04R 1/20; H04R 7/04; H04R 7/06; H04R 9/02; H04R 9/04; H04R 9/06; H04R 17/00; H04R 23/02; H04R 25/00; G06F 1/16; G06F 1/20; G06F 1/1605; G06F 3/01; G06F 3/043; G06F 3/16;
(Continued)

(56) References Cited

U.S. PATENT DOCUMENTS

| 4,496,871 A | 1/1985 | Sumita et al. |
| 5,604,337 A | 2/1997 | Sugimoto et al. |

(Continued)

FOREIGN PATENT DOCUMENTS

| CN | 109922412 A | 6/2019 |
| JP | 2001-309491 A | 11/2001 |

(Continued)

OTHER PUBLICATIONS

Office Action dated Apr. 22, 2021, issued in corresponding Japanese Patent Application No. 2020-115124.

(Continued)

*Primary Examiner* — Chanh D Nguyen
*Assistant Examiner* — Nguyen H Truong
(74) *Attorney, Agent, or Firm* — Morgan, Lewis & Bockius LLP

(57) ABSTRACT

The present disclosure relates to a display apparatus, especially having a display panel generating sounds. A display apparatus according to the present disclosure includes: a display module; a back cover at a rear surface of the display module; a depression recessed into the back cover from a first surface of the back cover with a first width and a first depth; a penetration through from a second surface of the back cover to the depression with a second width smaller than the first width and a second depth corresponding to a difference between a thickness of the back cover and the first depth; and a first piezo vibration unit disposed at a stepped portion between the penetration and the depression.

21 Claims, 6 Drawing Sheets

(51) Int. Cl.
  *G06F 1/20* (2006.01)
  *G10K 9/122* (2006.01)
(58) Field of Classification Search
  CPC ........ G10K 9/122; G10K 9/125; G10K 9/128; G08B 3/00; H02J 7/02; H02J 50/10; H02J 50/40; H04N 5/645
  See application file for complete search history.

(56) References Cited

U.S. PATENT DOCUMENTS

| | | |
|---|---|---|
| 2004/0246109 A1 | 12/2004 | Suzuki et al. |
| 2006/0039575 A1* | 2/2006 | Wada ................ H04R 1/025 381/152 |
| 2006/0078138 A1* | 4/2006 | Wada ................ H04R 1/028 381/306 |
| 2007/0189560 A1 | 8/2007 | Uenishi et al. |
| 2007/0223744 A1* | 9/2007 | Wada ................ H04R 23/008 381/152 |
| 2010/0246863 A1 | 9/2010 | Onishi et al. |
| 2012/0119617 A1* | 5/2012 | Takahashi .......... H01L 41/0973 310/317 |
| 2013/0265504 A1 | 10/2013 | Sato et al. |
| 2015/0010187 A1 | 1/2015 | Lee et al. |
| 2016/0219372 A1 | 7/2016 | Wang et al. |
| 2017/0280234 A1 | 9/2017 | Choi et al. |
| 2018/0024588 A1* | 1/2018 | Han ................ G06F 1/1605 381/333 |
| 2019/0166429 A1 | 5/2019 | Lee et al. |
| 2019/0182573 A1 | 6/2019 | Shin et al. |
| 2020/0120423 A1* | 4/2020 | Murrish ................ H04R 3/14 |
| 2020/0379709 A1* | 12/2020 | Kim ...................... H04R 7/04 |

FOREIGN PATENT DOCUMENTS

| | | |
|---|---|---|
| JP | 2004-336293 A | 11/2004 |
| JP | 2006-235438 A | 9/2006 |
| JP | 2007-96722 A | 4/2007 |
| JP | 2007096722 * | 4/2007 |
| JP | 2007-181156 A | 7/2007 |
| JP | WO2009/063905 A1 | 5/2009 |
| KR | 10-2012-027915 A | 3/2012 |
| KR | 10-2018-0098128 A | 9/2018 |

OTHER PUBLICATIONS

Office Action issued in corresponding Japanese Patent Application No. 202010588420.1 dated Aug. 4, 2021.

Extended European Search Report issued in corresponding European Patent Application No. 20181934.9, dated Dec. 22, 2020.

* cited by examiner

S1 < S2

DISPLAY APPARATUS

CROSS-REFERENCE TO RELATED APPLICATIONS

This application claims the benefit of the Korean Patent Application No. 10-2019-0080584 filed on Jul. 4, 2019, which is hereby incorporated by reference as if fully set forth herein.

BACKGROUND

Technical Field

The present disclosure relates to a display apparatus, especially having a display panel generating sounds.

Discussion of the Related Art

In general, the display apparatus is used as a screen to display visual information such as a television, a monitor, a laptop computer, a smart phone, a tablet computer, an electronic pad wearable device, a watch phone, a portable information device, a navigation system or an electronic products, a vehicle control display device or the home appliances.

A general display apparatus may include a display panel for representing a video image, and an audio device for providing sounds related to the video image. However, the conventional display apparatus has a limitation in which sound quality deteriorates due to interference between sounds reflected from a wall or the floor because the sounds output from the sound device proceed to the rear or bottom side of the display panel. Therefore, it is difficult to accurately provide the sound to the viewers, so that the immersion of viewers may be deteriorated.

SUMMARY

The inventors of the present disclosure recognized problems with a related display apparatus and conducted various experiments to improve the sound quality and to provide the sound to the front direction of the display panel when viewers see an image in front of the display panel. After a number of experiments, the inventors can provide a display apparatus having a new structure capable of generating sounds that can proceed in front of the display panel and improving the sound quality.

Accordingly, embodiments of the present disclosure are directed to a display apparatus that substantially obviates one or more of the problems due to limitations and disadvantages of the related art.

An aspect of the present disclosure is to provide a display apparatus accurately suggesting sounds. Another aspect of the present disclosure is to provide a display apparatus generating sounds proceeding to the front direction of the display panel.

Still another aspect of the present disclosure is to provide a display apparatus improving the sound quality and increasing viewer immersion. For example, the present disclosure provides a display apparatus maintaining an ultra-thin structure by mounting a sound generating device on the back side of the display panel inside of the rear cover.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a display apparatus comprises: a display module; a back cover disposed at a rear surface of the display module; a depression recessed into the back cover from a first surface of the back cover with a first width and a first depth; a penetration through from a second surface of the back cover to the depression with a second width smaller than the first width and a second depth corresponding to a difference between a thickness of the back cover and the first depth; and a first piezo vibration unit disposed at a stepped portion between the penetration and the depression.

In one embodiment, the display apparatus further comprises: an adhesive element attaching the second surface of the back cover having the penetration to the display module.

In one embodiment, the first piezo vibration unit includes: a metal substrate attached at the stepped portion; and a piezo element attached at a rear surface of the metal substrate.

In one embodiment, the first piezo vibration unit includes: a piezo element attached at the stepped portion; and a metal substrate attached at a rear surface of the piezo element.

In one embodiment, the first depth of the depression is smaller than a half of the thickness of the back cover.

In one embodiment, the first depth of the depression is larger than a half of the thickness of the back cover.

In one embodiment, the display apparatus further comprises: a heat radiating metal plate attached at portions of the rear surface of the display module exposed by the penetration.

In one embodiment, the display apparatus further comprises: an upper depression recessed into the back cover from the second surface of the back cover with a third width larger than the second width and a third depth less than the second depth.

In one embodiment, the display apparatus further comprises: a second piezo vibration unit disposed at a upper stepped portion between the upper depression and the penetration.

In one embodiment, the first piezo vibration unit generates a sound vibration having different frequency bandwidth from the second piezo vibration unit.

In another aspect, a display apparatus comprises: a display module including display panel displaying video images; a back cover disposed at a rear surface of the display module; a first depression formed at a rear surface of the back cover; a through hole penetrating the back cover from first depression to an upper surface of the back cover; and a vibration generating module disposed inside the first depression for providing sound vibration to the back cover via the through hole.

In one embodiment, the first depression has a depth larger than the through hole.

In one embodiment, the first depression has a depth smaller than the through hole.

In one embodiment, the vibration generating module includes: a piezo element; and a metal substrate attached at one of an upper surface and a lower surface of the piezo element.

In one embodiment, the display apparatus further comprises: a heat radiating metal plate attached at a portion of the rear surface of the display module exposed by the through hole.

In one embodiment, the first depression includes: a first width; and a first depth smaller than a thickness of the back cover. The through hole includes: a second width smaller than the first width; and a second depth corresponding to difference between the thickness of the back cover and the first depth.

In one embodiment, the display apparatus further comprises: a second depression formed at an upper surface of the back cover with a third width larger than the second width and a third depth smaller than the second depth. the through hole has a thickness corresponding to difference between the second depth and the third depth.

In one embodiment, the vibration generating module includes: a first piezo vibration unit disposed inside the first depression; and a second piezo vibration unit disposed inside the second depression.

In one embodiment, the first piezo vibration unit generates sound vibrations having frequency bandwidth different from the second piezo vibration unit.

In one embodiment, the vibration generating module includes: a piezo element; and an enclosure surrounding a rear space of the piezo element.

According to an example of the present disclosure, it is possible to provide a display apparatus accurately generating and transmitting the sounds, improving the sound quality, and increasing immersion of viewers. According to another example of the present disclosure, it is possible to provide a display apparatus generating sounds to the front of the display panel. In particular, with a structure in which a sound generating device providing sound vibration to a display panel is embedded inside of the rear cover, it is possible to provide a display apparatus with a built-in sound generating device having an ultra-thin structure. Further, by stacking and embedding sound generating devices of various frequency bands inside of the rear cover, it is possible to provide an ultra-thin display apparatus generating sounds of various bands.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
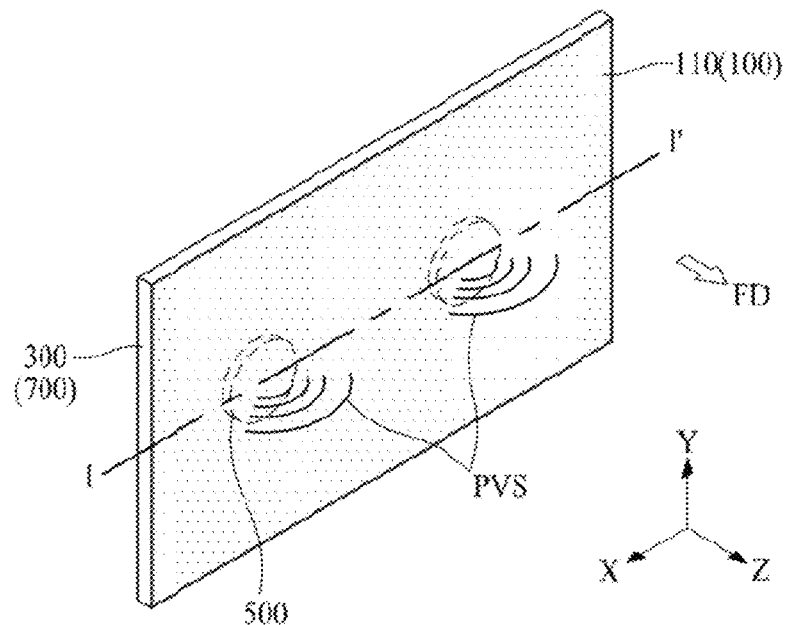
FIG. 1 is a diagram illustrating a display apparatus having a sound generating unit at the rear side according to the present disclosure.

Reference will now be made in detail to exemplary embodiments of the present disclosure, examples of which are illustrated in the accompanying drawings. Wherever possible, the same reference numbers will be used throughout the drawings to refer to the same or like parts. In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows. Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In the case that "comprise," "have," and "include" described in the present specification are used, another part may also be present unless "only" is used. The terms in a singular form may include plural forms unless noted to the contrary.

In construing an element, the element is construed as including an error range although there is no explicit description.

In describing a positional relationship, for example, when the positional order is described as "on," "above," "below," and "next," the case of no contact there-between may be included, unless "just" or "direct" is used. If it is mentioned that a first element is positioned "on" a second element, it does not mean that the first element is essentially positioned above the second element in the figure. The upper part and the lower part of an object concerned may be changed depending on the orientation of the object. Consequently, the case in which a first element is positioned "on" a second element includes the case in which the first element is positioned "below" the second element as well as the case in which the first element is positioned "above" the second element in the figure or in an actual configuration.

In describing a temporal relationship, for example, when the temporal order is described as "after," "subsequent," "next," and "before," a case which is not continuous may be included, unless "just" or "direct" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, terms such as the first, the second, A, B, (a) and (b) may be used. These terms are only to distinguish the elements from other elements, and the terns are not limited in nature, order, sequence or number of the elements. When an element is described as being "linked", "coupled" or "connected" to another element that element may be directly connected to or connected to that other element, but indirectly unless otherwise specified. It is to be understood that other elements may be "interposed" between each element that may be connected to or coupled to.

It should be understood that the term "at least one" includes all combinations related with any one item. For example, "at least one among a first element, a second element and a third element" may include all combinations of two or more elements selected from the first, second and third elements as well as each element of the first, second and third elements.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in a co-dependent relationship.

The 'display apparatus' in this application may comprise a liquid crystal module (LCM), an organic light emitting display module (OLED Module), or a quantum dot module (QD Module) which are have a display panel and a driver for driving the display panel. The 'display apparatus' may further comprise a complete product or final product including LCM, OLED Module or QD Module such as a notebook computer, a television set, a computer monitor, an equipment apparatus having an automotive apparatus or other modules for vehicle, a set electronic apparatus or a set device (or set apparatus) such as a smart phone or a mobile electronic apparatus.

Therefore, the 'display apparatus' may be any one of a display device such as LCM, OLED Module and QD Module, an application device including LCM, OLED Module or QD Module, or a set apparatus for end user's final devices.

In another example, the LCM, OLED Module or QD Module may be referred to the 'display apparatus', and the final electronic devices including LCM, OLED Module or QD Module may be referred to the 'set apparatus'. For example, the display apparatus may include a display panel of liquid crystal display or organic electroluminescence display, and a source printed circuit board (PCB) for driving the display panel. The set apparatus may include the display apparatus and a set PCB or control PCB for driving the set apparatus itself by connecting to the display apparatus and the source PCB.

The display panel according to the embodiments of the present disclosure may include a liquid crystal display panel, an organic light emitting diode display panel, and an electroluminescent display panel, but it is not limited thereto. For example, display panel may have any structure in which the display panel may be vibrated to generate sound. In addition, the display panel applied to the display apparatus according to the embodiment of the present disclosure is not limited to the shape or size of the display panel.

In the case that the display panel is the liquid crystal display panel, the display panel may include a plurality of gate lines, a plurality of data lines, and a plurality of pixels (or sub pixels) defined by the gate lines and the data lines. The display panel may include an array substrate including thin film transistor as a switching element for controlling the light transmittance of each pixel, an upper substrate including a color filter and/or a black matrix, and a liquid crystal layer disposed between the array substrate and the upper substrate.

In the case that the display panel is an organic light emitting diode display panel, the display panel may include a plurality of gate lines, a plurality of data lines, and a plurality of pixels (or sub pixels) defined by the gate lines and the data lines. The display panel may include an array substrate including thin film transistor for applying the electric voltage to each pixel selectively, an organic light emitting layer on the array substrate, and an encapsulation substrate disposed on the array substrate for covering the organic light emitting layer. The encapsulation substrate may protect the thin film transistor and the organic light emitting layer from any external shocks, and prevent moisture and oxygen from penetrating into the organic light emitting layer. In addition, the organic light emitting layer formed on the array substrate may be replaced by the inorganic light emitting layer, the quantum dot light emitting layer, or the micro light emitting diode element.

The display apparatus including the sound generating module according to the present disclosure may be applied to the vehicle as the user interface module such as the central control panel in the automobile. For example, the display panel may be installed at the center fascia between the driver seat and the assistant seat so that the vibration of the display panel propagates toward the interior space of the vehicle. Therefore, the in-car audio can be improved compared to having conventional speakers only at inside sides of the car.

Hereinafter, an example of a display apparatus according to the present disclosure will be described in detail with reference to the accompanying drawings. In designating reference numerals to elements of each drawing, the same components may have the same reference numerals as much as possible even though they are shown in different drawings. Scale of the elements shown in the accompanying drawings have a different scale from the actual for convenience of description, it is not limited to the scale shown in the drawings.

FIG. 1 is a diagram illustrating a display apparatus having a sound generating unit at the rear side according to the present disclosure. Referring to FIG. 1, the display apparatus according to the present disclosure may output acoustics or sounds PVS in accordance with vibration of a display module 100 for representing image data. For example, in a display apparatus, the display module 100 may be vibrated by the sound generating unit 500 to output sounds PVS. Most of the sounds PVS generated by the vibration of the display module 100 may be directly output toward the front of the screen FD of the display apparatus. The display apparatus according to the present disclosure can use the display module 100 as a diaphragm for generating sounds PVS and outputting the sounds PVS to the front of the screen FD of the display module 100. Accordingly, the sounds can be accurately transmitted to the viewers and the sound quality can be improved, and the immersion of viewers can be enhanced.

In the display apparatus according to the present disclosure, the sound generating unit 500 provides vibration forces to the display module 100, and the display module 100 vibrates to make sound. The display module 100 may be formed of a substrate easily vibrated such as a large area glass substrate, and may include a back cover 700 and a guide panel 300 for supporting the display module 100 on the rear surface of the display apparatus. Installing the vibration generating device to the rear surface of the display module 100 by replacing with the speaker used in the related arts, the present disclosure may provide a structure for maintaining the thickness of the whole display apparatus including the display module 100 in a very thin thickness. Hereinafter, referring to figures, various embodiments of the present disclosure will be described in detail.

First Embodiment

Figure 2:
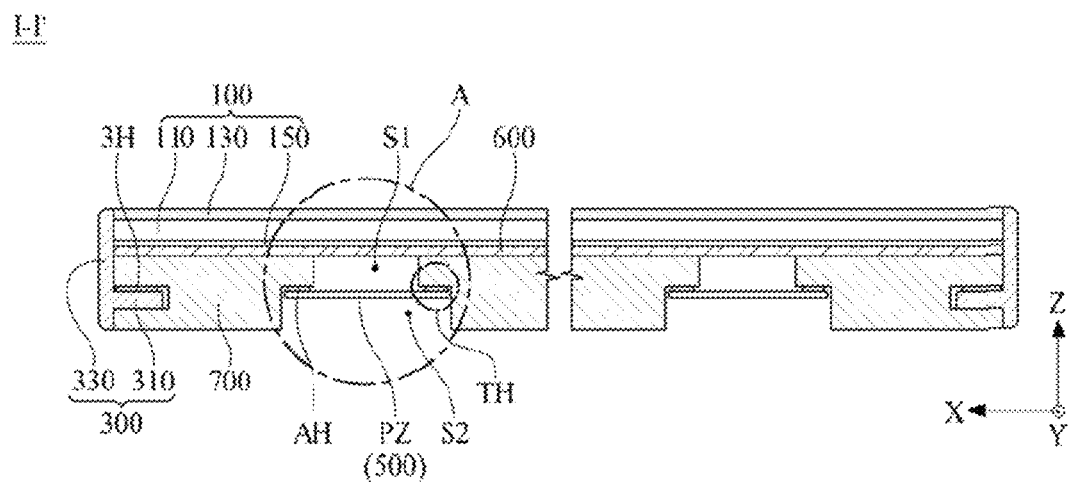
FIG. 2 is a cross-sectional view, cutting along I-I' in FIG. 1, illustrating a structure of the display apparatus according to the first embodiment of the present disclosure.

FIG. 2 is a cross-sectional view, cutting along I-I' in FIG. 1, illustrating a structure of the display apparatus according to the first embodiment of the present disclosure. When it is necessary, it will be described with reference to FIG. 1 showing the overall structure of the display apparatus according to the present disclosure.

Referring to FIG. 2, a display apparatus according to the first embodiment of the present disclosure may comprise a display module 100, a back cover 700 and a sound generating unit 500. The sound generation unit 500 may be implemented as a piezo vibration unit (or piezoelectric vibration unit) PZ suitable for mounting inside the back cover 700 which may be coupled to the rear surface of the display module 100. For example, a piezo element or an electrical active material (EAM) may be used for the sound generating unit 500.

The display module 100 may include a display panel 110, a functional film 130 and a heat diffusion element 150. The display panel 110 may be implemented as various types of the display. The display panel 110 may vibrate in response to the vibration of the sound generating unit 500 to directly output the sounds PVS to the front direction FD, thereby the display panel 110 may function as a speaker or a vibrating plate which is directly generating the sounds PVS. For example, when display module 100 plays role for generating the sounds PVS, the display module 100 may be a diaphragm, a panel speaker or a flat speaker that directly generates the sounds PVS.

In one example, the display panel 110 may include a pixel circuit disposed on a substrate (or base substrate), and a pixel array layer (or display unit) connected to the pixel circuit and having an anode electrode, a cathode electrode and an organic emission layer. The display panel 110 may display an image in a top emission type, a bottom emission type or a dual emission type according to the structure of the pixel array layer. The anode electrode may be expressed as a first electrode or a pixel electrode, but it is not limited to this term. The cathode electrode may be expressed as a second electrode or a common electrode, but it is not limited to this term.

The functional film 130 may include an anti-reflection layer (or anti-reflective film) for preventing ambient light reflection and improving outdoor visibility and contrast ratio for an image displayed on the display panel 110. For example, the anti-reflection layer may be a circular polarized layer (or circular polarization film) that prevents reflected light from being reflected by thin film transistors and/or lines disposed at the pixel array layer of the display panel 1100 to the viewers. Although not shown in figures, the functional film 130 may be attached on the display panel 110 using a transparent adhesive layer.

In one example, the functional film 130 may further include a light path control layer (or an optical film) that adjusts a path of light emitted from the pixel array layer of the display panel 110 toward viewers. The light path control layer may include a structure in which a high refractive layer and a low refractive layer are alternately stacked, thereby the path of light incident from the pixel array layer may be changed to minimize the color shift phenomena according to the viewing angle. In this case, the low refractive layer may be disposed at the topmost layer of the light path control layer.

In one example, the display module 100 may further include a touch electrode unit for user interface using a user's touch. The touch electrode unit may be inserted between the display panel 110 and the functional film 130 or embedded into the display panel 110 for the in-cell touch type. For example of the in-cell touch type, the touch electrode unit may include the touch electrodes of the mutual capacitance type or the self-capacitance type.

The heat diffusion element 150 may have a thin sheet shape adhered to the whole rear surface of the display panel 110. The heat diffusion element 150 may be disposed on the rear surface of the display module 100 so as to overlap with the sound generating unit 500, thereby the heat generated when the sound generating unit 500 is operated may be diffused toward the display module 100. Accordingly the performance degradation of the sound generating unit 500 caused by the heat can be prevented. In addition, the heat diffusion element 150 may have a size corresponding to the whole rear surface of the display panel 110 to diffuse the heat generated, when the sound generating unit 500 is operated, to the wider areas. Accordingly, it is possible to prevent the heat from being intensively concentrated to a local area of the display module 100 overlapping with the sound generating unit 500, thereby the local luminance non-uniformity of the display module 100 can be minimized or prevented.

For example, the heat diffusion element 150 may include a material having high thermal conductivity such as any one material of aluminum (Al), copper (Cu), silver (Ag) and magnesium (Mg) or an alloy of them, but it is not limited thereto.

The back cover 700 may be disposed on the rear surface of the display module 100. The back cover 700 may mount or fix the sound generating unit 500 therein.

In one example, the back cover 700 may cover the rear surface of the display module 100. The back cover 300 may be expressed as a supporting member, a housing, a system cover, a set cover, a rear cover, a cover bottom, a back frame, or chassis, but it is not limited thereto. The rear surface of the display module 100 may be expressed as one side, a first side, a back surface or a lower surface, but it is not limited thereto.

The back cover 700 may be attached to the rear surface of the display module 100 with an adhesive element 600. The adhesive element 600 may include a pressure sensitive adhesive (PSA), an optical clear adhesive (OCA) or an optical clear resin (OCR), but it is not limited thereto. Attached with whole of the rear surface of the display module 100, the back cover 700 may function for protecting the rear surface of the display module 100 from any external shocks and for dissipating the heat generated from the display module 100.

In one example, the back cover 700 may have a plate shape covering the whole rear surface of the display module 100, i.e., the entire rear surface of the heat diffusion element 150. In some examples, the edge portions or the corner portions of the back cover 700 may have a sloped shape or a curved shape by chamfering or rounding process.

In one example, the back cover 700 may include a penetration S1 or a depression S2. The penetration S1 may be a through-hole penetrating the back cover 700 from the front surface to the rear surface. The depression S2 may have a well shape in which some thickness of the back cover 700 is removed to be sinked down from the rear surface. The depression S2 and the penetration S1 may be formed continuously as having a concentric circle, so that the back cover 700 may have a through-hole including the depression S2 and the penetration S1.

The penetration S1 may have a smaller width than the depression S2. In this case, a step portion TH may be formed between the penetration S1 and the depression S2. Here, the penetration S1 and the depression S2 may have the same depth or any one may have larger depth than other. FIG. 2 shows the case in which the penetration S1 has the same depth as the depression S2.

A piezo vibration unit PZ may be installed inside of the depression S2. In detail, using an adhesive AH, the piezo vibration unit PZ may be fixed at the step portion TH. As shown in FIG. 2, the piezo vibration unit PZ may be mounted inside of the back cover 700, so the whole thickness of the display apparatus is not increased to keep in thin condition as the original back cover thickness.

It is preferable that the sound generating unit 500 may be made of a thin film type element, such as a piezo vibration unit PZ for implementing the thin structure of the display apparatus. Between the piezo vibration unit PZ and the display panel 100, an empty space implemented by the penetration S1 is disposed. The vibration generated from the piezo vibration unit PZ may vibrate the air filled within the space of penetration S1, and then the portions of the rear surface of the display panel 100 corresponding to the penetration S1. Accordingly, the sounds PVS may be transmitted to the front direction FD.

In one example, the display apparatus may include a sound generating module disposed at central portion (or middle area) of the display module 100. In detail, one sound generating module may vibrate the rear central portion of the display module 100 to provide the sounds PVS from the vibration of the display module 100.

In another example, the display apparatus may include a first sound generating unit disposed at a first area (or a left area) and a second sound generating unit disposed at a second area (or a right area), with respect to the central line of the rear surface of the display module 100. In detail, the first sound generating unit may vibrate the first rear area of the display module 100 to provide the sounds PVS by the vibration of the first area of the display module 100. The second sound generating unit may vibrate the second rear area of the display module 100 to provide the sounds PVS by the vibration of the second area of the display module 100. Accordingly, the display apparatus may output two channel stereo sounds by separating left and right sounds using the first and second sound generating units. In this case, the first sound generating unit may be configured to output the left ear sound, and the second sound generating unit may be configured to output the right ear sound.

In one example, at least one sound generating unit 500 may be disposed inside of the back cover 700 to provide the sounds PVS by vibrating the display module 100. That is, the sound generating unit 500 may be surrounded by the back cover 700 so that it is concealed without being exposed to the outermost rear surface of the display apparatus. Therefore, the display apparatus according to the embodiment of the present disclosure may have a clean back design that is inconspicuous to the user so that the design of rear structure of the display apparatus may be visually enhanced.

In one example, at least one sound generating unit 500 may be a single structure or a single element modularized as a single component. In detail, the sound generating unit 500 may be manufactured in the form of a final product such as a single structure or a single element by a modularization process (or an assembly process) not included in an assembly process of the display device. After that, during the assembly process of the display apparatus, the sound generating unit 500 may be mounted or installed at the step portion TH provide inside of the back cover 300 by a component mounting process. Accordingly, the present disclosure may improve the assembling process of the sound generating unit 500 to the display apparatus, thereby enhancing the production yield.

The display apparatus according to the first embodiment of the present disclosure may further include a guide panel 300. The guide panel 300 may support the circumferences of the display module 100 and the back cover 700, respectively, and may have a structure surrounding each side surface of the display module 100 and the back cover 700.

In one example, the guide panel 300 may be attached to the rear circumferences of the display module 100 with a guide adhesive 3H. The guide panel 300 may be expressed as a middle cabinet, a middle cover, or a middle chassis, but it is not limited thereto.

In one example, the guide panel 300 may include a metal material or a plastic material. In detail, the guide panel 300 may be preferably made of a metal material to improve the side appearance design of the display apparatus and to protect the side surface of the display apparatus.

In one example, the guide panel 300 may include a supporting element 310 and a side wall 330.

The supporting element 310 may be coupled to the back cover 700 by being inserted into a groove formed in a side surface of the back cover 700 of the display module 100. The front surface of the supporting element 310 may be combined with the surface of one side of the groove part of the back cover 700 using the guide adhesive 3H. The support element 310 may have any thickness, but it is preferable that it is easy to engage with the back cover 700 and it has sufficient rigidity so that it is not easily separated from the back cover 700.

In one example, the supporting element 310 may have a single frame structure in a square shape, but it is not limited thereto. For example, the supporting element 310 may have a plurality of split bar shapes that are inserted into the edge of the back cover 700.

The guide adhesive 3H may be disposed between the groove portion of the back cover 300 and any one inner side of the supporting element 310. For example, the guide adhesive 3H may be an adhesive resin, a double-side tape, or a double-side adhesive foam pad, but it is not limited thereto.

The side wall 330 may be vertically coupled to the outer surface of the supporting element 310 to be parallel to the thickness direction Z of the display apparatus. The side wall 330 may surround both the outer surface (or, outer wall) of the display module 100 and the outer surface of the back cover 700. Accordingly, the side wall 300 may protect the outer surface of each of the display module 100 and the back cover 700 so as to improve the outer design of the side surface of the display apparatus. In one example, the guide panel 300 may have a frame structure having a cross-sectional structure of a "⊢"shape as the supporting element 310 are coupled to each other to form a single body.

The display according to the present disclosure may include an adhesive element instead of the guide panel 300. Interposed between the rear edge of the display module 100 and the front edge of the back cover 700, the adhesive element may bond the display module 100 and the back cover 700.

In the case that the display apparatus includes the adhesive element instead of guide panel 300, the back cover 700 may include a side wall cover portion surrounding both the outer surface (or outer wall) of the display module 100 and the outer surface of the back cover 700 and the outer surface of the adhesive element.

According to the display apparatus according to the present disclosure, the display panel 110 may be vibrated by the sound generating unit 500 disposed inside the back cover 700 bonded to the rear surface of the display module 100, and the sounds PVS generated by this vibration may be output to forward direction FD. Therefore, the viewer's immersion as viewing the video information of the display apparatus may be improved.

Further, according to the first embodiment of the present disclosure, the display apparatus may provide the sounds PVS from the vibration of the display panel 110, so that it is not required additional speaker. Accordingly, it can improve the degree of the freedom for the design of the set device and the placement of the speakers.

Figure 3:
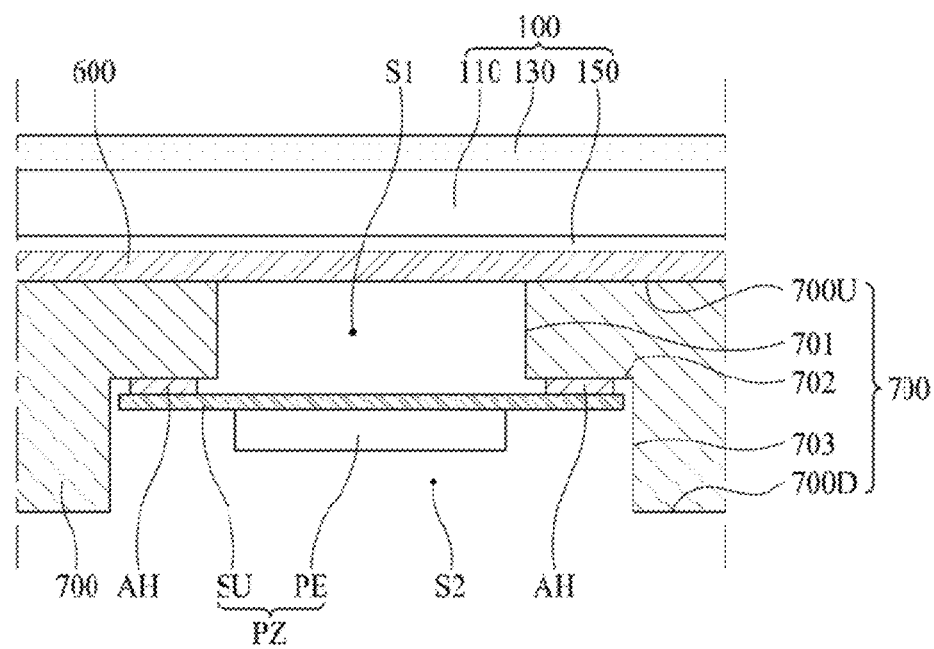
FIG. 3 is an enlarged cross-sectional view illustrating a structure of a display apparatus according to the second embodiment of the present disclosure.

Hereinafter, in various embodiments of the present disclosure, the mounting structure of the sound generating unit 500, particularly the piezo vibration unit PZ, which is a core configuration of this disclosure, in the back cover 700 is described in detail Second Embodiment FIG. 3 is an enlarged cross-sectional view illustrating a structure of a display apparatus according to the second embodiment of the present disclosure. FIG. 3 is an enlarged view of a portion indicated by circle A in FIG. 1. Hereinafter, the main configuration of the second embodiment will be mainly explained. The configurations not shown in FIG. 3 may be referred to FIGS. 1 and 2.

Referring to FIG. 3, the display apparatus according to the second embodiment of the present disclosure may comprise a display module 100, a back cover 700 and a piezo vibration unit PZ. The display module 100 may be same as the first embodiment, so detail explanation will not be duplicated.

The back cover 700 may be also same with the first embodiment, excepting the detailed structures of the penetration S1 and the depression S2. The back cover 700 may include a penetration S1 and a depression S2. The depression S2 may have a well shape in which some depths from the rear surface 700D of the back cover 700 to the inside of the back cover 700 are removed or recessed. The penetration S1 may have a through hole shape by removing from the front surface 700U of the back cover 700 to the depression S2 through the back cover 700. That is, the sum of the depth of the penetration S1 and the depth of the depression S2 may be corresponding to the whole thickness of the back cover 700.

The penetration S1 and the depression S2 are connected to each other to have a structure passing through the back cover 700. However, the depression S2 is not the structure for penetrating the back cover 700, but for mounting the piezo vibration unit PZ inside of the back cover 700. Therefore, the depression S2 may be expressed as a recessed portion, a sinkhole, or a subside portion, but it is not limited thereto. On the contrary, the penetration S1 may be formed as to provide a space for transmit the vibration generated from the piezo vibration unit PZ mounted at the depression S2 to the rear surface of the display panel 100 exactly or accurately. Therefore, the penetration S1 may be expressed as an opening, a through hole or a perforation, but it is not limited thereto.

Accordingly, in the cross-section view of the penetration S1 and depression S2, a stepped structure may be formed between the front surface 700U of the back cover 700 and the rear surface 700B of the back cover 700. For example, the penetration S1 may have a first width and a first depth. The first width may be corresponding to the width of the opening formed at the front surface 700U of the back cover 700. The first depth may be corresponding to the recessed depth of the opening extended innerward the back cover 700. For example, the first depth may be corresponding to the length of the side wall 701 of the penetration S1.

The depression S2 may be corresponding to a space provided between a middle surface 702 and the rear surface 700 of the rear surface 700D, in which the middle surface 702 may be expanded from an inner end of the side wall 701 of the penetration S1 to a horizontal direction of the back cover 700. For example, the depression S2 may have a second width and a second depth. The second width may be corresponding to the width of the opening formed at the rear surface 700D of the back cover 700. The second depth may be corresponding to the recessed depth of the opening of the depression S2 extended innerward the back cover 700. For example, the second depth may be corresponding to the length of the side wall 703 of the depression S2.

Here, the second width meaning the size of the opening of the depression S2 may be larger than the first width meaning the size of the opening of the penetration S1. The second depth meaning the depth of the depression S2 may be same with the first depth meaning the depth of the penetration S1. The penetration S1 and the depression S2 may be arranged so that their centers overlap each other to have a symmetrical shape, but it is not limited thereto. Otherwise, the penetration S1 may be disposed to be biased to the depression S2.

The piezo vibration unit PZ according to the second embodiment may include a piezo vibrator (or piezoelectric vibrator) PE and a metal substrate SU. The piezo vibrator PE may be expressed as a piezoelectric resonator or a piezoelectric actuator. The piezoelectric vibrator PE refers to a device that generates vibration by applying an electric field using the principle that a distortion occurs when an electric field is applied to two different types of crystals, or a piezoelectricity is generated when an external force is applied to the crystals.

The metal substrate SU may be disposed at the middle surface 702 between the depression S2 and the penetration S1 formed at the back cover 700. For example, using an adhesive element AH, the metal substrate SU may be attached at the middle surface 702. The piezo vibrator PE may be attached at the rear surface of the metal substrate SU.

For example, the piezo vibrator PE and the metal substrate SU may be made as one body and the circumferences of the metal substrate SU may be attached at the middle surface 702 using the adhesive element AH.

When piezo vibrator PE generates the vibrations by the electric force, the air in the penetration S1 may be vibrated by the movement of the metal substrate SU so that a sound pressure may be generated. This sound pressure may be transmitted to the rear surface of the display panel 100, and the display panel 100 may be vibrated, so that the sound vibration may be transmitted to the entire display panel 100.

Here, the vibration generated by the piezo vibrator PE may be determined as a sound wave of a predetermined band in accordance with the type and thickness of the metal substrate SU. For example, when the thickness of the metal substrate SU is thin, a high-frequency sound may be generated, and when the thickness is thick, a low-frequency sound may be generated.

In addition, the vibration generated by the piezo vibrator PE may be also determined as a sound wave of a predetermined band in accordance with the volume of the penetration S1. For example, as the volume of the penetration S1 is increased, lower and lower sound frequency vibrations may be generated. In some examples, adjusting the volume and shape of the penetration S1, the sound quality may be expressed differently.

Third Embodiment

Figure 4:
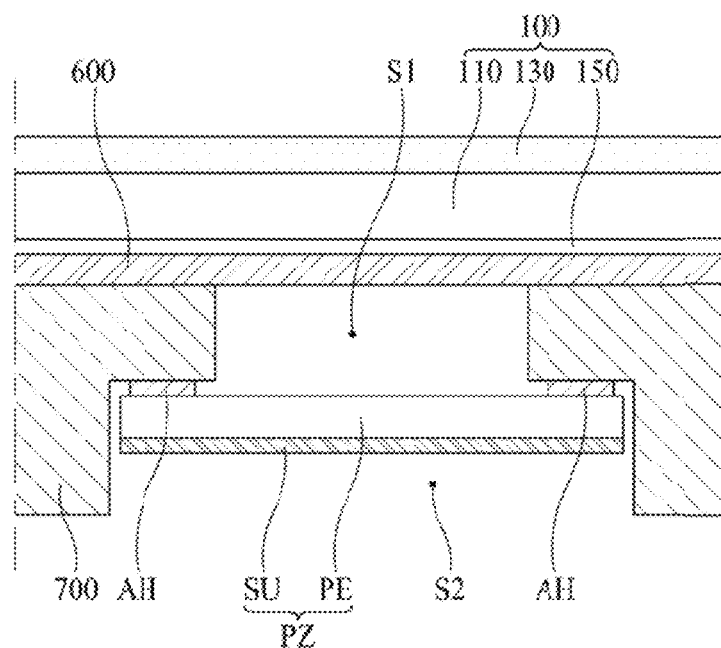
FIG. 4 is an enlarged cross-sectional view illustrating a structure of a display structure according to the third embodiment of the present disclosure.

FIG. 4 is an enlarged cross-sectional view illustrating a structure of a display structure according to the third embodiment of the present disclosure. FIG. 4 is an enlarged view of a portion indicated by circle A in FIG. 1. Hereinafter, main element of the third embodiment will be explained. For the elements not shown in FIG. 4, FIGS. 1 to 3 may be referred.

Referring to FIG. 4, the display apparatus according to the third embodiment of the present disclosure may comprise a display module 100, a back cover 700 and a piezo vibration unit PZ. The display module 100 may be same as the first embodiment, so detail explanation will not be duplicated.

In the third embodiment, the piezo vibration unit PZ may include a piezo vibrator PE and a metal substrate SU. The piezo vibrator PE may be disposed at the middle surface 702 between the depression S2 and the penetration S1 formed inside of the back cover 700. For example, using an adhesive element AH, the piezo vibrator PE may be attached at the middle surface 702. The metal substrate SU may be attached at the rear surface of the piezo vibrator PE.

For example, the piezo vibrator PE and the metal substrate SU may be made as one body and the circumferences of the metal substrate SU may be attached at the middle surface 702 using the adhesive element AH.

When piezo vibrator PE generates the vibrations by the electric force, the air in the penetration S1 may be vibrated and then a sound pressure may be generated. This sound pressure may be transmitted to the rear surface of the display panel 100, and some portions of the display panel 100 corresponding to the penetration S1 may be vibrated, so that the sound vibration may be transmitted to the entire display panel 100.

Using the metal substrate SU attached at the rear surface of the piezo vibrator PE, the frequency band of the sound generated by the piezo vibrator PE may be adjusted. In addition, the heat generated from the piezo vibrator PE may be radiated to the external environment of the depression S2.

Fourth Embodiment

Figure 5:
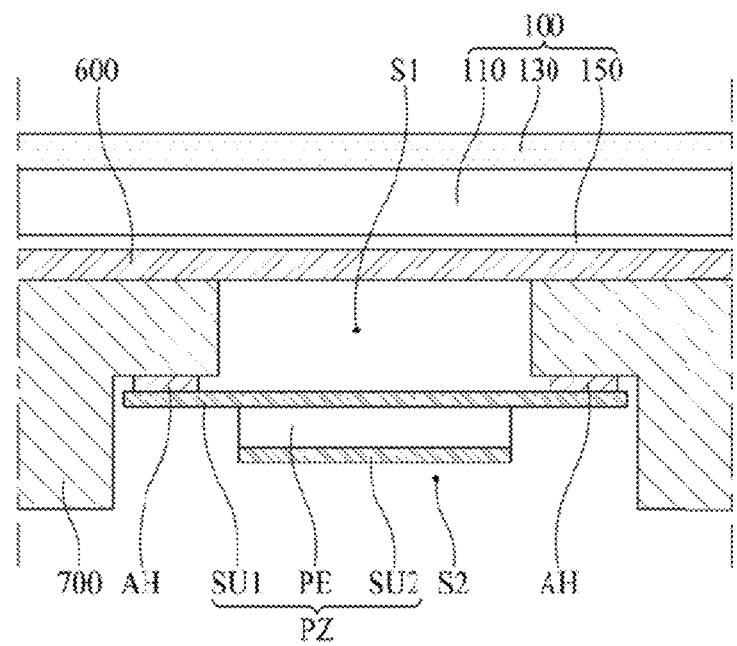
FIG. 5 is an enlarged cross-sectional view illustrating a structure of a display structure according to the fourth embodiment of the present disclosure.

FIG. 5 is an enlarged cross-sectional view illustrating a structure of a display structure according to the fourth embodiment of the present disclosure. FIG. 5 is an enlarged view of a portion indicated by circle A in FIG. 1. Hereinafter, main elements of the fourth embodiment will be explained. For the elements not shown in FIG. 5, FIGS. 1 to 4 may be referred.

Referring to FIG. 5, the display apparatus according to the fourth embodiment of the present disclosure may comprise a display module 100, a back cover 700 and a piezo vibration unit PZ. The display module 100 may be same as the embodiments explained above, so detail explanation will not be duplicated.

The piezo vibration unit PZ according to the fourth embodiment may comprises a piezo vibrator PE, a first metal substrate SU1 and a second metal substrate SU2. The piezo vibration unit PZ according to the fourth embodiment may have all characteristics of the piezo vibration unit PZ according to the second and the third embodiments.

The first metal substrate SU1 may be disposed at the middle surface 702 between the depression S2 and the penetration S1 formed at the back cover 700. For example, using an adhesive element AH, the first metal substrate SU1 may be attached at the middle surface 702.

The piezo vibrator PE may be attached at the rear surface of the first metal substrate SU1. The piezo vibrator PE may be attached at the middle portion of the rear surface of the first metal substrate SU1. In other example, even though not shown in figures, the whole surface of the first metal substrate SU1 may have the same size of the piezo vibrator PE.

The second metal substrate SU2 may be attached at the rear surface of the piezo vibrator PE. For example, the second metal substrate SU2 may be formed as an integrated shape with the piezo vibrator PE covering the whole rear surface of the piezo vibrator PE.

In one example, the first metal substrate SU1, the piezo vibrator PE and the second metal substrate SU2 may be formed as one body, and then the circumferences of the first metal substrate SU1 may be attached at the middle surface 702 using the adhesive element.

When the piezo vibrator PE generates the vibrations by the electric force, the air in the penetration S1 may be vibrated and then a sound pressure may be generated. This sound pressure may be transmitted to the rear surface of the display panel 100, and some portions of the display panel 100 corresponding to the penetration S1 may be vibrated, so that the sound vibration may be transmitted or propagated to the entire display panel 100.

Using the first metal substrate SU1 attached at the front surface of the piezo vibrator PE and the second metal substrate SU2 attached at the rear surface of the piezo vibrator PE, the frequency band range of the sound generated by the piezo vibrator PE may be adjusted to be wider and more diversely. In addition, as the first metal substrate SU1 and the second metal substrate SU2 are disposed at both surfaces of the piezo vibrator PE, the heat generated from the piezo vibrator PE may be radiated to the external environment through the penetration S1 and/or the depression S2 more effectively. That is, comparing with the third embodiment, by providing one more metal substrate, a higher quality sound may be obtained, and the heat dissipation effect may be more excellent.

Fifth Embodiment

Figure 6:
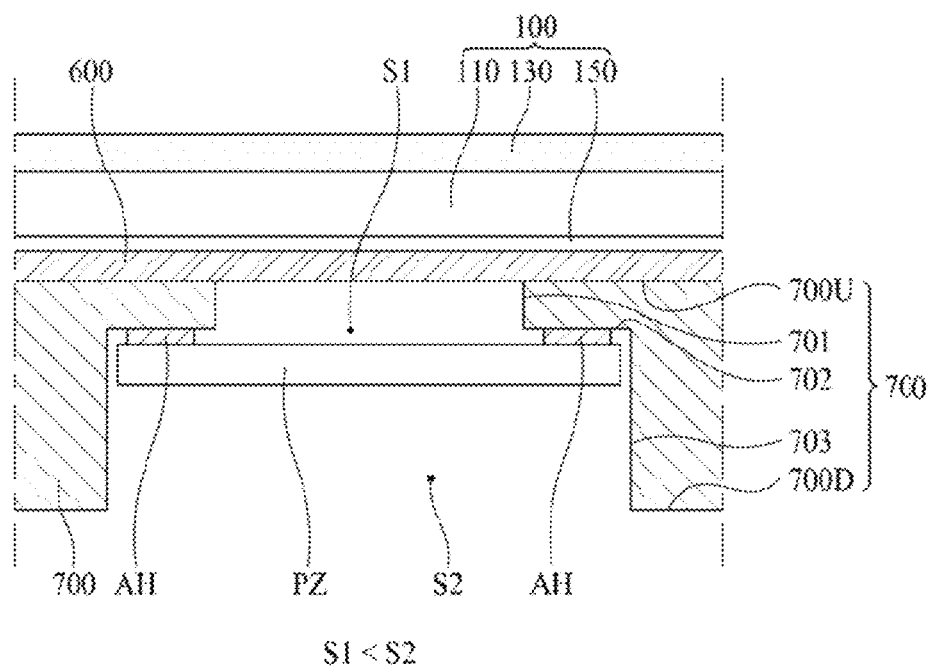
FIG. 6 is an enlarged cross-sectional view illustrating a structure of a display structure according to the fifth embodiment of the present disclosure.

FIG. 6 is an enlarged cross-sectional view illustrating a structure of a display structure according to the fifth embodiment of the present disclosure. The structure of the display apparatus according to the fifth embodiment as shown in FIG. 6 may be very similar with the structure of the display apparatus according to the first embodiment. The difference is that the volume of the penetration S1 may be remarkably smaller than the volume of the depression S2. On the contrary with the FIG. 6, even though not shown in figures, the volume of the penetration S1 may be remarkably larger than the volume of the depression S2.

By setting the volume of the penetration S1, the bandwidth of the sound generated by the piezo vibration unit PZ may be adjusted. For example, when the piezo vibration unit PZ is designed to generate high-frequency sound band, the volume of the penetrating S1 may be formed as small as possible. Conversely, when the piezo vibration unit PZ is designed to generate low-frequency sound band, the volume of the penetrating S1 as large as possible.

Although not shown in the figures, when setting the volume of the penetration S1, the side wall 701 of the penetration S1 may be formed in a diagonal line instead of a vertical line in a cross-sectional view so that the volume of the penetration S1 may be variously designed. In addition, in order to suppress the resonance phenomenon to the sound generated by the piezo vibration unit PZ, the cross-sectional profile of the side wall 701 of the penetrating S1 may be formed to have a sawtooth or wave shape instead of a straight line. Further, the shape of the opening (on the top view) of the penetrating S1 may be formed to have a serrated irregular closed curve, not a circular or polygonal curve.

In the embodiments explained above, various examples have been described for the cases in which only one piezo vibration unit PZ is disposed in one sound generating unit 500. Hereinafter, various embodiments for cases in which two piezo vibration unit PZ are provided in one sound generating unit 500 will be explained.

Sixth Embodiment

Figure 7:
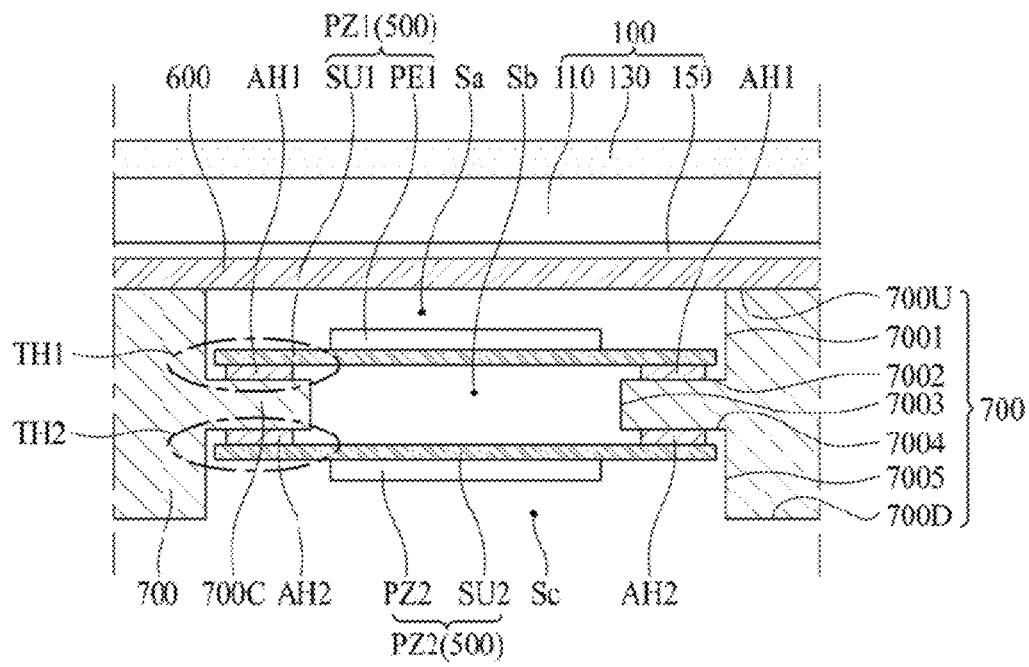
FIG. 7 is an enlarged cross-sectional view illustrating a structure of a display structure according to the sixth embodiment of the present disclosure.

FIG. 7 is an enlarged cross-sectional view illustrating a structure of a display structure according to the sixth embodiment of the present disclosure. When necessary, it will be described with reference to FIG. 1 showing the overall structure of the display apparatus according to the present disclosure.

Referring to FIG. 7, the display apparatus according to the sixth embodiment of the present disclosure may comprise a display module 100, a back cover 700 and a sound generating unit 500. It is preferable that the sound generating unit 500 may be implemented as a piezo vibration unit PZ which is coupled to the rear surface of the display module 100 suitable for mounting inside the back cover 700. For example, the sound generating unit 500 may include a piezoelectric elements or an electric active material (EAM).

The display module 100 may include a display panel 110, a functional film 130 and a heat diffusion element 150. The display module 100 may be same with the embodiments explained above, the duplicated explanation will not be duplicated.

The back cover 700 may be disposed at the rear surface of the display panel 100. The sound generating unit 500 may be mounted or installed inside of the back cover 700. For example, the back cover 700 may be attached at the rear surface of the display module 100 using an adhesive element 600. The adhesive element 600 may include a pressure sensitive adhesive (PSA), an optical clear adhesive (OCA), or and optical clear resin (OCR), but it is not limited thereto. With attaching to the whole of the rear surface of the display module 100, the back cover 700 may protect the rear surface of the display module 100 from external shocks and radiate the heat generated from the display module 100 to the external environment.

In one example, the back cover 700 may include an upper depression Sa, a penetration Sb and a lower depression Sc. The upper depression Sa may have a first well shape in which a some portions of the back cover 700 from the front surface to innerward with a first thickness is removed. The lower depression Sc may have a second well shape in which other portions of the back cover 700 from the rear surface to innerward with a second thickness is removed. Further, the penetration Sb may have a through hole penetrating the remained back cover 700 between the upper depression Sa and the lower depression Sc. Therefore, viewing in a cross-section, a stepped portion 700C forming the penetration Sb may have a structure protruding between the upper depression Sa and the lower depression Sc.

As the upper depression Sa, the penetration Sb and the lower depression Sc are continuously formed, the through hole may be formed as one body. The penetration Sb may have a width (or diameter) than the width of the upper depression Sa or the lower depression Sb. Accordingly, a first stepped portion TH1 may be formed between the upper depression Sa and the penetration Sb, and a second stepped portion TH2 may be formed between the lower depression Sc and the penetration Sb. Here, the depth of the penetration Sb and the depth of the upper depression Sa or the depth of the lower depression Sc may be same. Otherwise, one of them may be larger than others. In FIG. 7, the upper depression Sa and the lower depression Sc have the same depth, and the penetration Sb has smaller depth than those of the upper and lower depressions Sa and Sc.

The upper depression Sa, the penetration Sb and the lower depression Sb are linked continuously so that the back cover 700 is totally penetrated. However, the upper depression Sa and the lower depression Sc are not penetrating the back cover 700. The upper depression Sa is a structure for installing the first piezo vibration unit PZ1 and the lower depression Sc is a structure for installing the second piezo vibration unit PZ2. The penetration Sb is a structure for preparing a space for transmitting the acoustic vibration generated from the first and second piezo vibration units PZ1 and PZ2 to the rear surface of the display panel 100.

Therefor, according to the cross-sectional view of the upper depression Sa, the penetration Sb and the lower depression Sc, an irregular (or stepped) shape is formed between the front surface 700U and the rear surface 700D of the back cover 700. For example, the upper depression Sa may have a first width and a first depth. The first width may refer to the width of the opening formed at the front surface 700U of the back cover 700. The first depth may refer to the extended length of the opening of the upper depression Sa inward of the back cover 700 from the front surface 700U. For example, the first depth of the upper depression Sa may be corresponding to the length of the side wall 7001 of the upper depression Sa.

The penetration Sb may have a second width and a second depth. The second width may refer to the width of the opening formed at the stepped portion 700C. The second depth may refer to the depth through which the penetration Sb penetrates the stepped portion 700C. For example, the second depth may be corresponding to the length of the side wall 7003 of the penetration Sb.

The lower depression Sc may have a third width and a third depth. The third width may refer to a width of the opening formed at the rear surface 700D of the back cover 700. The third depth may refer to the extended length of the opening of the lower depression Sc inward of the back cover 700 from the rear surface 700D. For example, the third depth of the lower depression Sc may be corresponding to the length of the side wall 7005 of the upper depression Sa.

As the stepped portion 700C has the extruded structure, the stepped portion 700C may have an upper surface 7002, side wall 7003 of the penetration Sb and a lower surface 7004. For example, the upper surface 7002 may be a plane linking the lower side of the side wall 7001 and the upper depression Sa and the upper side of the side wall 7003 of the penetration Sb. The lower surface 7004 may be a plane linking the lower side of the side wall 7003 of the penetration Sc and the side wall 7005 of the lower depression Sc.

Here, the first width meaning the opening size of the upper depression Sa may be larger than the second width meaning the opening size of the penetration Sb. Further, the first depth meaning the depth of the upper depression Sa may be larger than the second depth meaning the depth of the penetration Sb. The third width meaning the opening size of the lower depression Sc may be same with the first width. In addition, the third depth meaning the depth of the lower depression Sc may be same with the first depth.

The upper depression Sa, the penetration Sb and the lower depression Sc may be arranged so that the centers are overlapped to form a concentric shape, but it is not limited thereto. Each of the centers may be relatively biased and be arranged to one side.

In the sixth embodiment, the sound generating unit 500 may include a first piezo vibration unit PZ1 and a second piezo vibration unit PZ2. The first piezo vibration unit PZ1 may be attached to the upper surface 7002 of the stepped portion 700C using a first adhesive AH1. The second piezo vibration unit PZ2 may be attached to the lower surface 7004 of the stepped portion 700C using a second adhesive AH2.

For example, the first piezo vibration unit PZ1 may include a first piezo vibrator PE1 and a first metal substrate SU1. The first metal substrate SU1 may be installed at the upper surface 7002 of the stepped portion 700C disposed between the upper depression Sa and the penetration Sb. For example, using the first adhesive AH1, the first metal substrate SU1 may be attached on the upper surface 7002 of the stepped portion 700C. In addition, the first piezo vibrator PE1 may be attached on the upper surface of the first metal substrate SU1.

Further, the second piezo vibration unit PZ2 may include a second piezo vibrator PE2 and a second metal substrate SU2. The second metal substrate SU2 may be installed at the lower surface 7004 of the stepped portion 700C disposed between the lower depression Sc and the penetration Sb. For example, using the second adhesive AH2, the second metal substrate SU2 may be attached on the lower surface 7004 of the stepped portion 700C. In addition, the second piezo vibrator PE2 may be attached on the lower surface of the second metal substrate SU2.

In another example, the first piezo vibration unit PE1 and the first metal substrate SU1 may be formed as one body, and the circumferences of the first metal substrate SU1 may be attached on the upper surface 7002 of the stepped portion 700C using the first adhesive AH1. Further, the second piezo vibration unit PE2 and the second metal substrate SU2 may be formed as one body, and the circumferences of the second metal substrate SU2 may be attached on the lower surface 7004 of the stepped portion 700C using the second adhesive AH2.

When the first and second piezo vibrators PE1 and PE2 generate the vibrations by the electric force, the air in the upper depression Sa and the penetration Sb may be vibrated by the first and the second metal substrates SU1 and SU2, and then a sound pressure may be generated. This sound pressure may be transmitted to the rear surface of the display panel 100, and some portions of the display panel 100 corresponding to the opening may be vibrated, so that the sound vibration may be transmitted or propagated to the entire display panel 100.

Here, according to the kinds of the thicknesses of the first and the second metal substrates SU1 and SU2, the vibrations generated by the first and the second piezo vibrators PE1 and PE2 may be defined to have certain bandwidth of sound wave. For example, as the thicknesses of the first and second metal substrates SU1 and SU2 are thinner and thinner, the sound vibration may have higher frequency bandwidth. As the thicknesses of the first and second metal substrates SU1 and SU2 are thicker and thicker, the sound vibration may have lower frequency bandwidth.

In addition, when the first piezo vibrator PE1 and the second piezo vibrator PE2 generate the sound vibration in the same frequency bandwidth having the same phase with each other, a resonance effect of amplifying the volume can be obtained, because of the structure in which the first and second metal substrates SU1 and SU2 are facing each other symmetrically. For example, the first piezo vibrator PE1 and the second piezo vibrator PE2 may be constituted by a piezoelectric element or an electrical active material and the polarities of the driving voltages are opposite to each other. In this case, as shown in FIG. 7, it is possible to obtain an effect of resonating such that the amplitude of the sound vibration may be multiplied due to the symmetrical arrangement structure. As a result, 2-way structure with an increased amount of the amplitude and an increased sound pressure may be acquired.

With the structure of sixth embodiment of the present disclosure, in a thin structure display apparatus, rich sound quality with improved amplitude and sound pressure may be obtained without mounting a speaker that is easily visible from the outside.

Seventh Embodiment

Figure 8:
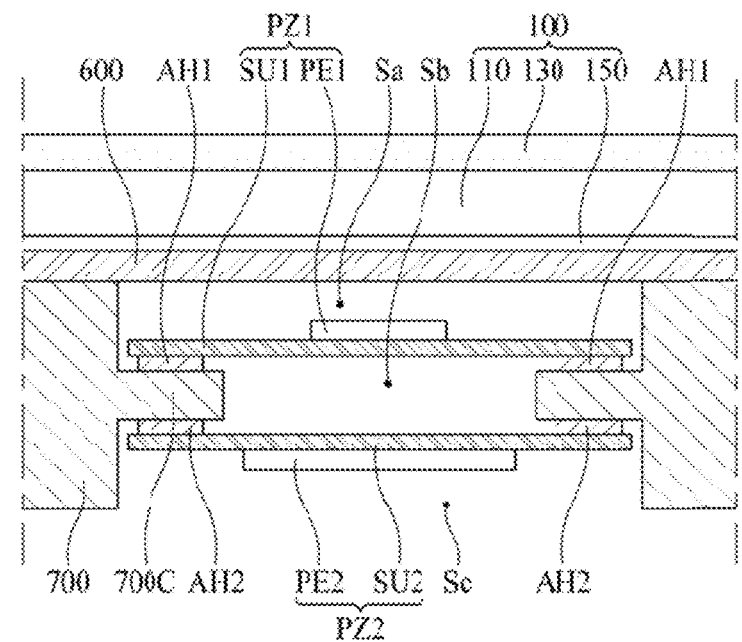
FIG. 8 is an enlarged cross-sectional view illustrating a structure of a display structure according to the seventh embodiment of the present disclosure.

FIG. 8 is an enlarged cross-sectional view illustrating a structure of a display structure according to the seventh embodiment of the present disclosure. The display apparatus according to the seventh embodiment of the present disclosure shown in FIG. 8 may have the very similar structure with the sixth embodiment shown in FIG. 7. The difference is that the first piezo vibrator PE1 has the different size from the second piezo vibrator PE2, in the seventh embodiment.

The size difference between the first piezo vibrator PE1 and the second piezo vibrator PE2 is not merely to show the size, but to show the difference in the bandwidth of the sound vibration. For example, a small sized vibrator may generate sound vibration in a higher frequency bandwidth than a large sized vibrator. As shown in FIG. 8, the first piezo vibrator PE1 may be disposed in the upper depression Sa for generating high-frequency sound vibration. The second piezo vibrator PE2 may be disposed in the lower depression Sc for generating low-frequency sound vibration.

In one example, the first piezo vibrator PE1 may be a small area piezoelectric element or an EAM capable of implementing a tweeter. The second piezo vibrator PE2 may be a large area piezoelectric element or EAM capable of implementing a woofer.

In the display apparatus according to the seventh embodiment of the present disclosure, by placing two vibrators generating sound vibrations of different frequency bandwidths in a stacked structure in the same space, the display apparatus can generate sounds of various frequency bandwidths. Therefore, by providing a high frequency sound and a mid-range sound separately without having a speaker exposed to the appearance of the very thin display apparatus, richer sound quality can be provided.

Eighth Embodiment

Figure 9:
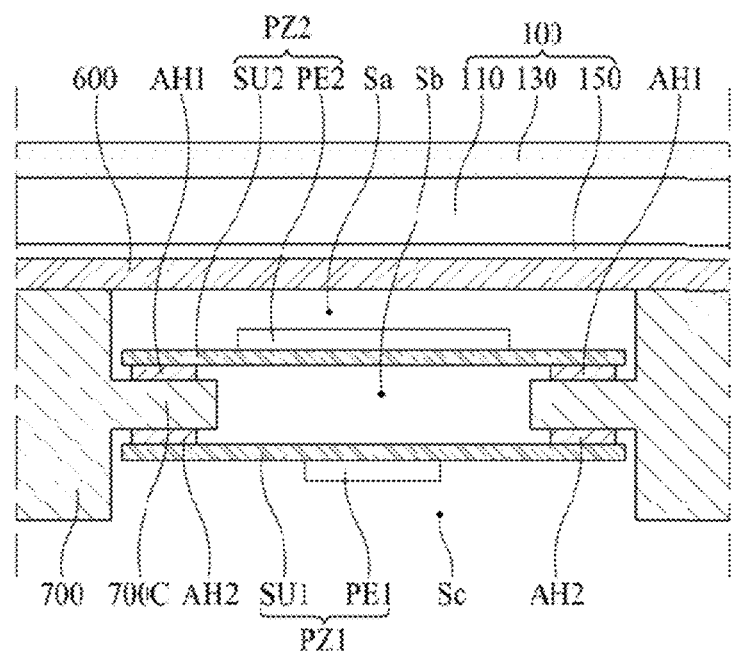
FIG. 9 is an enlarged cross-sectional view illustrating a structure of a display structure according to the eighth embodiment of the present disclosure.

FIG. 9 is an enlarged cross-sectional view illustrating a structure of a display structure according to the eighth embodiment of the present disclosure. The display apparatus according to the eighth embodiment of the present disclosure shown in FIG. 9 may have the very similar structure with the seventh embodiment shown in FIG. 8. The difference is that the first piezo vibrator PE1 is disposed at the different position from the second piezo vibrator PE2, in the eighth embodiment.

As shown in FIG. 9, the second piezo vibrator PE2 generating sounds of low frequency bandwidth may be disposed at the upper depression Sa, and the first piezo vibrator PE1 generating sounds of high frequency bandwidth may be disposed at the lower depression Sc. For example, the first piezo vibrator PE1 may be a small area piezoelectric element or an EAM capable of implementing a tweeter. The second piezo vibrator PE2 may be a large area piezoelectric element or EAM capable of implementing a woofer.

In the display apparatus according to the eighth embodiment of the present disclosure, by placing two vibrators generating sound vibrations of different frequency bandwidths in a stacked structure in the same space, the display apparatus can generate sounds of various frequency bandwidths. Therefore, by providing a high frequency sound and a mid-range sound separately without having a speaker exposed to the appearance of the very thin display apparatus, richer sound quality can be provided.

The frequency bandwidth may refer to the tone height of the sound. The audible frequency, 16 to 20,000 Hz, may be divided into 10 octaves, and it is divided into low, mid and high ranges of frequencies. In detail, it can be classified as follows.

TABLE 1

| Bandwidth | Details | Frequency (Hz) |
| --- | --- | --- |
| Low range | Deep Bass | 20~40 |
| | Midbass | 40~80 |
| | Upper Bass | 80~160 |
| Mid range | Lower Midrange | 160~320 |
| | Middle Midrange | 320~640 |
| | Upper Midrange | 640~1,280 |
| High range | Lower Treble | 1,280~2,560 |
| | Middle Treble | 2,560~5,210 |
| | Upper Treble | 5,210~10,240 |
| | Top Octave | 10,240~20,480 |

In the seventh and eighth embodiments of the present disclosure, each piezo vibrator may be configured to generate sounds of different frequency bandwidths, thereby providing richer sound quality.

When adapting a piezoelectric element, it is preferable to be able to transmit the high-frequency sounds, efficiently. Especially, To maintain the sound pressure of the 5 kHz bandwidth sounds, the space design of the penetration may be very important.

For example, for the cases of the first to fifth embodiments explained with FIGS. 2 to 6, it is very important to design the space of the penetration S1 when the vibration generated from the piezo vibration unit PZ is reflected by the rear surface of the display panel 100, so as not to affect the phase of the vibration of the piezo vibration unit PZ. In order to prevent the phase change from occurring, as shown in equation 1 below, the arrival time of the echo sound must be equal to or less than ½ of the period of the sound bandwidth. In the following equation, the maximum spatial separation distance which is not affected by the reverberation, is calculated for the frequency of 5 kHz which is a reference for the high frequency sound.

$$t = \frac{1}{2f} = \frac{1}{2(5,000)} = 0.0001 \text{ sec} \qquad \text{[Equation 1]}$$

Here, 't' refers to the arrival time of the echo sound, 'f' refers to the frequency of sound.

Therefore, the effective distance of the penetration S1, that is the first depth, may become '343 m/sec×0.0001 sec=0.0343 m=3.43 mm', when calculating based on the sound speed of 343 m/sec. In the first to fifth embodiments, when the piezo vibration unit PZ generates a sound of 5 kHz, the depth of the penetration S1 may have a value of 3.43 mm or less.

In the above embodiments, in consideration of the frequency bandwidth generated from the piezo vibration unit to be applied, the depth of the upper depression Sa and. or the penetrations Sb and S1 may be designed to provide high quality sounds without being canceled out or disappeared.

Ninth Embodiment

Figure 10:
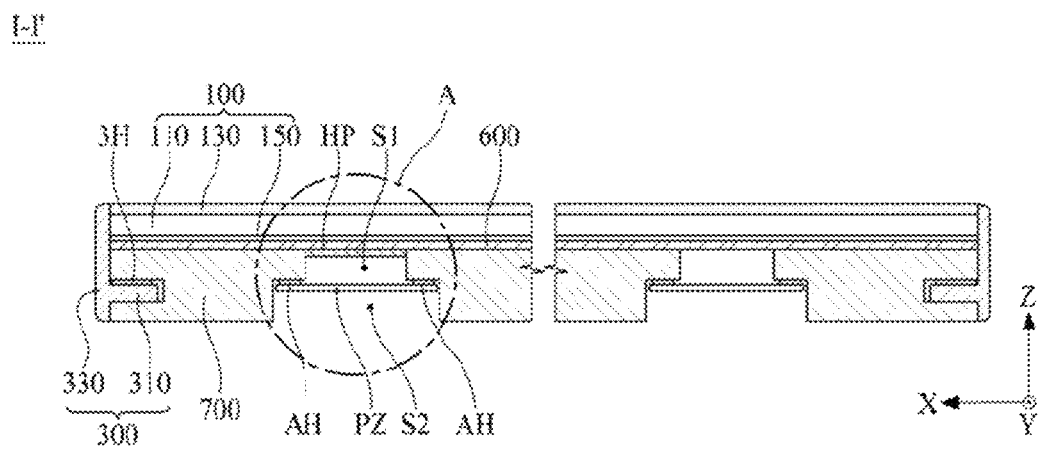
FIG. 10 is an enlarged cross-sectional view illustrating a structure of a display structure according to the ninth embodiment of the present disclosure.

FIG. 10 is an enlarged cross-sectional view illustrating a structure of a display structure according to the ninth embodiment of the present disclosure. In the ninth embodiment, a case in which a heat radiating metal plate that can be applied to all of the previous embodiments may be further configured will be described.

FIG. 10 is an enlarged cross-sectional view illustrating an example in which a heat radiating metal plate HP is further included in the FIG. 2 showing the first embodiment of the present disclosure. Referring to FIG. 10, the display apparatus according to the ninth embodiment of the present disclosure may comprise a display module 100, a back cover 700, a heat radiating metal plate HP and a sound generating unit 500. The display module 100, the back cover 700, and the sound generating unit 500 may be selected any one of the embodiments explained above.

Additionally, the heat radiating metal plate HP may be included. Specifically, the heat radiating metal plate HP may be attached a portion of the rear surface of the display panel 100 exposed by the penetration S1. Otherwise, the heat radiating metal plate HP may be another portion of the rear surface of the display panel 100 exposed by the upper depression Sa. The heat radiating metal plate HP may be attached on the adhesive element 600 applied to the rear surface of the display panel 100 in order for joining the back cover 700 to the rear surface of the display panel 100.

Further including a heat radiating metal plate HP attached to the rear surface of the display panel 100 opposite the vibration generating unit 500, the display panel according to the ninth embodiment of the present disclosure may induce the heat generated by the piezo vibration unit PZ to be easily discharged into the air without being directly transferred to the display panel 100.

Tenth Embodiment

Figure 11:
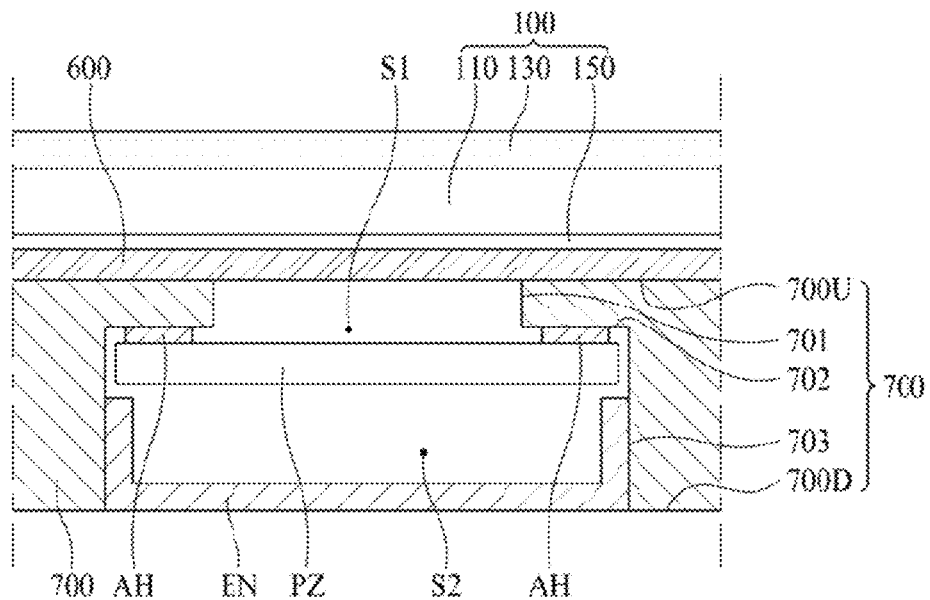
FIG. 11 is an enlarged cross-sectional view illustrating a structure of a display structure according to the tenth embodiment of the present disclosure.

FIG. 11 is an enlarged cross-sectional view illustrating a structure of a display structure according to the tenth embodiment of the present disclosure. FIG. 11 is an enlarged view of a portion indicated by circle A in FIG. 1. Hereinafter, the main configuration of the tenth embodiment will be mainly explained. The configurations not shown in FIG. 11 may be referred to FIGS. 1 to 10.

Referring to FIG. 11, the display apparatus according to the tenth embodiment of the present disclosure may comprise a display module 100, a back cover 700, a piezo vibration unit PZ and an enclosure EN. The display module 100 may be same as the first embodiment, so detail explanation will not be duplicated.

In the tenth embodiment, the piezo vibration unit PZ may be disposed at the middle surface between the depression S2 and the penetration S1. For an example, using an adhesive element AH, the piezo vibration unit PZ may be attached on the middle surface 702. For another example, a metal substrate may be further included, as shown in FIGS. 4 and 5. In this embodiment, the metal substrate is not treated as an essential element.

In the tenth embodiment, the enclosure EN may be further included for sealing the space of the depression S2 in which the piezo vibration unit PZ is disposed. As in the previous embodiment, the depression S2 or the lower depression Sc may be configured in an open state. In this case, the sound wave generated from the vibration of the piezo vibration unit PZ may be output to the rear direction from the back cover 700, so that the most of sounds may not be provided to the front direction.

It is preferable to seal the rear space of the open depression S2 so as to prevent sounds from being lost to the rear side and to concentrate sounds in the front direction FD. To do so, the enclosure EN may have a lid shape corresponding to the opening area of the depression S2. The enclosure EN may be made of an elastic material and inserted into the depression S2. Alternatively, although not shown in the drawings, the threads may be formed on the side 703 of the depression S2, and the threads may be also formed on the side of the enclosure EN, so that the enclosure may close or open the depression S2 in accordance with the interlocking structure of the threads.

When piezo vibration unit PZ generates the vibrations by the electric force, the air in the penetration S1 may be vibrated so that a sound pressure may be generated. This sound pressure may be transmitted to the rear surface of the display panel 100, and the display panel 100 may be vibrated, so that the sound vibration may be transmitted to the entire display panel 100. Further, as the enclosure EN seals the depression S2 which is the rear space of the piezo vibration unit PZ, the sound vibration reflected by the depression S2 may be reflected back by the enclosure EN to the front direction FD.

Eleventh Embodiment

Figure 12:
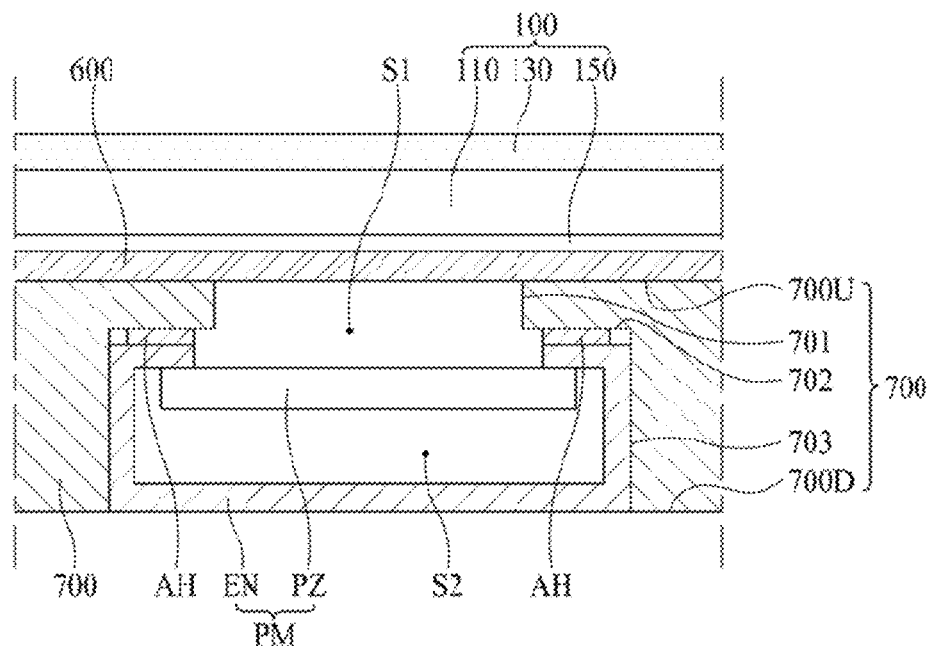
FIG. 12 is an enlarged cross-sectional view illustrating a structure of a display structure according to the eleventh embodiment of the present disclosure.

FIG. 12 is an enlarged cross-sectional view illustrating a structure of a display structure according to the eleventh embodiment of the present disclosure. FIG. 12 is an enlarged view of a portion indicated by circle A in FIG. 1. Hereinafter, the main configurations of the eleventh embodiment will be explained. The configurations not shown in FIG. 12 may be referred to FIGS. 1 to 11.

Referring to FIG. 12, the display apparatus according to the tenth embodiment of the present disclosure may comprise a display module 100, a back cover 700 and a piezo vibration module PM. The display module 100 may be same as the first embodiment, so detail explanation will not be duplicated.

Unlike the previous embodiments, the eleventh embodiment has a feature in which the piezo vibration module PM is included. The piezo vibration module PM may include a piezo vibration unit PZ and an enclosure EN formed as one body.

The piezo vibration unit PZ may be mounded inside the enclosure EN. Even though not shown in drawings, the outer edges of the piezo vibration unit PZ may be attached to the mounting surface provided inside the enclosure EN using an adhesive. The enclosure EN may be configured such that a portion of the upper surface facing the penetration S1 is opened so that vibration generated by the piezo vibration unit PZ can be transmitted to the penetration S1 without any losses. For another example, as shown in FIGS. 4 and 5, a metal substrate attached to an upper surface or a lower surface of the piezo vibration unit PZ may be further provided. In this embodiment, the metal substrate is not treated as an essential element.

The piezo vibration module PM may be disposed at the middle surface 702 between the depression S2 and the penetration S1 formed in the back cover 700. For example, using an adhesive element AH, the piezo vibration module PM may be attached at the middle surface 702.

The feature of the eleventh embodiment is that the piezo vibration unit PZ and the enclosure EN described in the tenth embodiment are designed as one module. The size and shape of the enclosure EN may be customized to have a space suitable for a sound bandwidth of the piezo vibration unit PZ. Further, by inserting and sealing the enclosure EN into the depression S2, the vibration element can by simply installed on the rear surface of the display panel. In addition, even in the case of conducting the repair works, the damaged piezo vibration module PM may be easily removed and a new piezo vibration module PM is re-installed simply.

The piezo vibration module PM has a structural feature of having its own enclosure EN for sealing the space of the depression S2 in which the piezo vibration PZ is disposed. When applied to the previous embodiments, all components of the display apparatus may be completed by simply inserting the piezo vibration module EN into the depression S2 or the bottom depression Sc.

Moreover, since the enclosure EN is built-in, it is possible to prevent sounds from being lost to the rear side and to concentrate the sounds in the front direction FD of the display apparatus. The enclosure EN may have a thin vessel shape corresponding to the opening area of the depression S2. The enclosure EN may be made of an elastic material and inserted into the depression S2. Alternatively, although not shown in the drawings, the threads may be formed on the side 703 of the depression S2, and the threads may be also formed on the outer side of the enclosure EN, so that the enclosure may close or open the depression S2 in accordance with the interlocking structure of the threads.

The enclosure EN has been described as having a structure for perfectly sealing the back space of the piezo vibration unit PZ. However, it is not limited thereto. In some cases, the enclosure EN may further include a resonance hole having a predetermined size. In these cases, the enclosure EN may have a structure surrounding the back space of the piezo vibration unit PZ rather than sealing it.

When piezo vibration unit PZ generates the vibrations by the electric force, the air in the penetration S1 may be vibrated so that a sound pressure may be generated. This sound pressure may be transmitted to the rear surface of the display panel 100, and the display panel 100 may be vibrated, so that the sound vibration may be transmitted to the entire display panel 100. Further, as the enclosure EN seals the depression S2 which is the rear space of the piezo vibration unit PZ, the sound vibration reflected by the depression S2 may be reflected back by the enclosure EN to the front direction FD.

The display apparatus according to the eleventh embodiment of the present disclosure may provide a modularized piezo vibration module PM. The piezo vibration module PM may be freely configured to have a resonance space by the enclosure EN, and it may be easy to configure and control a unique sound vibration mode. Therefore, it is possible to ensure the high sound quality in a desired sound bandwidth, especially in a high bandwidths.

Features, structures, effects and so on described in the above described examples of the present disclosure are included in at least one example of the present disclosure, and are not necessarily limited to only one example. Furthermore, features, structures, effects and so on exemplified in at least one example of the present disclosure may be implemented by combining or modifying other examples by a person having ordinary skilled in this field. Therefore, contents related to such combinations and modifications should be interpreted as being included in the scope of the present application.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A display apparatus, comprising:
    a display module;
    a back cover disposed at a rear surface of the display module;
    one or more depressions, a depression of the one or more depressions recessed into the back cover from a first surface of the back cover with a first width and a first depth;
    one or more penetrations, a penetration of the one or more penetrations through from a second surface of the back cover to the depression with a second width smaller than the first width and a second depth corresponding to a difference between a thickness of the back cover and the first depth; and
    a first piezo vibration unit disposed at a stepped portion between the penetration and the depression,
    wherein:
    the first piezo vibration unit is disposed within a space from the first surface of the back cover to the second surface of the back cover, the space corresponding to the thickness of the back cover;
    the second surface of the back cover, excluding one or more regions corresponding to the one or more penetrations, is connected to the display module via one or more layers, wherein the one or more layers are not air; and
    the second surface of the back cover extends from a first edge of the display module to a second edge of the display module.

2. The display apparatus according to claim 1, wherein:
    the one or more layers comprise an adhesive element; and
    the adhesive element attaches the second surface of the back cover having the penetration to the display module.

3. The display apparatus according to claim 1, wherein the first piezo vibration unit includes:
    a metal substrate attached at the stepped portion; and
    a piezo element attached at a rear surface of the metal substrate.

4. The display apparatus according to claim 1, wherein the first piezo vibration unit includes:
    a piezo element attached at the stepped portion; and
    a metal substrate attached at a rear surface of the piezo element.

5. The display apparatus according to claim 1, wherein the first depth of the depression is smaller than a half of the thickness of the back cover.

6. The display apparatus according to claim 1, wherein the first depth of the depression is larger than a half of the thickness of the back cover.

7. The display apparatus according to claim 1, further comprising:
    a heat radiating metal plate attached at portions of the rear surface of the display module exposed by the penetration.

8. The display apparatus according to claim 1, wherein:
    the second surface of the back cover is an entire uppermost surface of the back cover;
    the second surface of the back cover is flat without steps except for the one or more regions; and
    the one or more regions comprise one or more voids.

9. The display apparatus according to claim 1, wherein:
    the back cover is one unitary body extending from the first edge of the display module to the second edge of the display module; and
    the back cover does not surround a side of the display module.

10. The display apparatus according to claim 1, wherein an entirety of the first piezo vibration unit is disposed within the depression.

11. A display apparatus, comprising:
    a display module including a display panel for displaying video images;
    a back cover disposed at a rear surface of the display module;

one or more first depressions, a first depression of the one or more first depressions formed at a rear surface of the back cover;

one or more through holes, a through hole of the one or more through holes penetrating the back cover from the first depression to an upper surface of the back cover; and a vibration generating module disposed inside the first depression for providing sound vibration to the back cover via the through hole, wherein:

the vibration generating module is disposed within a space from the rear surface of the back cover to the upper surface of the back cover, the space corresponding to a thickness of the back cover;

the upper surface of the back cover, excluding one or more regions corresponding to the one or more through holes, is connected to the display module via one or more layers, wherein the one or more layers are not air; and the upper surface of the back cover extends from a first edge of the display module to a second edge of the display module.

12. The display apparatus according to claim 11, wherein the first depression has a depth larger than the through hole.

13. The display apparatus according to claim 11, wherein the first depression has a depth smaller than the through hole.

14. The display apparatus according to claim 11, wherein the vibration generating module includes:

a piezo element; and a metal substrate attached at one of an upper surface and a lower surface of the piezo element.

15. The display apparatus according to claim 11, further comprising:

a heat radiating metal plate attached at a portion of the rear surface of the display module exposed by the through hole.

16. The display apparatus according to claim 11, wherein the first depression includes:

a first width; and a first depth smaller than the thickness of the back cover, and wherein the through hole includes:

a second width smaller than the first width; and a second depth corresponding to a difference between the thickness of the back cover and the first depth.

17. The display apparatus according to claim 11, wherein the vibration generating module includes:

a piezo element; and an enclosure surrounding a rear space of the piezo element.

18. A display apparatus, comprising:

a display module;

a back cover disposed at a rear surface of the display module;

one or more first depressions, wherein a first depression of the one or more first depressions is recessed into the back cover from a first surface of the back cover;

one or more second depressions, wherein a second depression of the one or more second depressions is recessed into the back cover from a second surface of the back cover;

one or more penetrations, wherein a penetration of the one or more penetrations penetrates between the first depression and the second depression; and a first piezo vibration unit disposed at the first depression, wherein:

the first piezo vibration unit is disposed within a space from the first surface of the back cover to the second surface of the back cover, the space corresponding to a thickness of the back cover;

the second surface of the back cover, excluding one or more regions corresponding to the one or more second depressions, is connected to the display module via one or more layers, wherein the one or more layers are not air; and the second surface of the back cover extends from a first edge of the display module to a second edge of the display module.

19. The display apparatus according to claim 18, wherein:

the first depression has a first width and a first depth;

the second depression has a second width and a second depth;

the penetration has a third width and a third depth;

each of the first width and the second width is larger than the third width;

each of the first depth, the second depth and the third depth is less than the thickness of the back cover; and the display apparatus further comprises a second piezo vibration unit disposed at the second depression.

20. The display apparatus according to claim 19, wherein the first piezo vibration unit is configured to generate a sound vibration having a different frequency bandwidth from the second piezo vibration unit.

21. The display apparatus according to claim 19, wherein any one of the first piezo vibration unit and the second piezo vibration unit is configured to generate sound vibrations corresponding to a frequency bandwidth of 10 KHz to 1 KHz, and wherein the other is configured to generate sound vibrations corresponding to a frequency bandwidth of 320 Hz to 1,280 Hz.

* * * * *